Jan. 24, 1939. L. E. LAWRENCE ET AL 2,144,925
VARIABLE RESISTANCE UNIT
Filed July 2, 1937
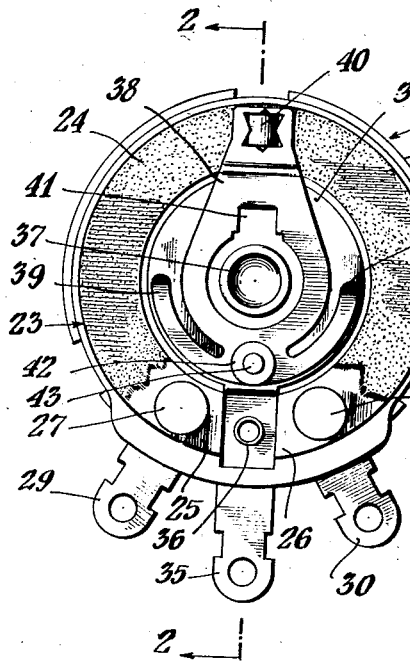
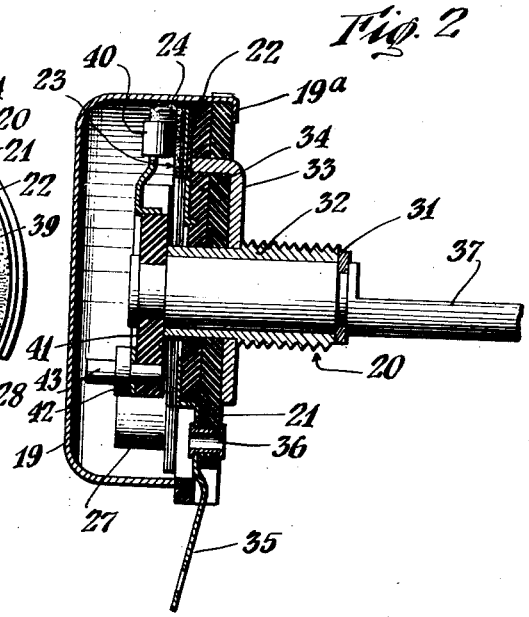
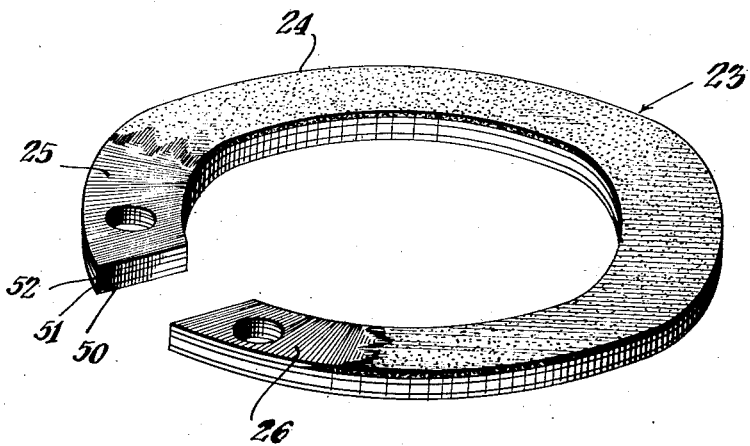
INVENTORS
Leland E. Lawrence
BY Robert O. Lewis
ATTORNEY Patented Jan. 24, 1939

2,144,925

UNITED STATES PATENT OFFICE 2,144,925

VARIABLE RESISTANCE UNIT

Leland E. Lawrence and Robert O. Lewis, Indianapolis, Ind., assignors to P. R. Mallory & Co., Inc., Indianapolis, Ind., a corporation of Delaware Application July 2, 1936, Serial No. 88,552

8 Claims. (Cl. 201—55)

This invention relates to variable resistance devices and more particularly to variable resistances comprising a layer of resistance material on a supporting base.

An object of the invention is to improve a variable resistance device.

Another object is to improve a resistance element and the base thereof.

Other objects of the invention will be apparent from the following description and accompanying drawing taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawing.

In the drawing:

Figure 1 is a face view of a variable resistance device with the cover thereof removed;

Figure 2 is a section on the line 2—2 of Figure 1, but with the cover in place; and Figure 3 is a perspective view of the resistance element for said variable resistance device.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Variable resistance devices have been made heretofore having a resistance element comprising a disc or ring of insulating material upon which is a coating or layer of resistance material such as carbon paint. The insulating materials used for the ring base have been of two types, hard and soft. An example of a hard base material is Bakelite fibre. The most common soft material has been porous paper of the nature of blotting paper. The hard base material provides a unit which is fairly constant under different conditions of humidity but is somewhat noisy in operation. The soft base, on the other hand, produces a volume control which is more quiet in operation, but its humidity coefficient is higher.

According to one aspect of the present invention a base for a resistance element is provided which has the inherent softness which gives quiet operation and also is substantially unaffected by humidity. The base is preferably made of a porous fibrous material such as paper and is impregnated with a material which has a high resistance to humidity, preferably a gelatinizing oil such as tung oil.

Referring to the drawing a variable resistance device is illustrated in Figures 1 and 2 embodying a resistance element made according to the present invention. The variable resistance device 20 comprises a base formed of two superimposed discs 21 and 22 of insulation, such as fibre impregnated with a synthetic resin. Discs 21 and 22 each have suitable cutout portions to accommodate other parts of the resistor structure. A metal cover or cap 19 is secured to the discs 21 and 22 by ears 19a and encloses the operating parts.

The resistance element of the device, namely ring 23, is mounted against the face of disc 22. According to the preferred form of the invention ring 23 comprises a laminated paper base, such as that illustrated in Figure 3, having a layer 24 of resistance paint, such as graphite or other carbon or metal particles, conductive oxide particles or the like in a binder such as shellac deposited on its surface.

The element may also preferably be provided with a pair of conductive terminals 25 and 26 at the two ends of the resistance layer and in electrical contact with the same. Terminal 25 and 26 may be of conductive paint, such as silver particles in a shellac binder.

The base itself preferably comprises three laminae which are all adhered together into a single unitary sheet, the backing lamina being of litho paper, the center of newsprint paper and the face upon which the resistance surface is deposited being of manila paper. It is found that this particular combination of papers results in a unit which is substantially flat after impregnation and coating with resistance paint.

In making the resistance elements rings of the shape shown in Figure 3 are punched from the laminated paper described above and soaked in a solution consisting of about 10% or 15% raw tung oil in a suitable volatile solvent, such as naphtha, for about one hour.

The tung oil used is preferably oil which has not been treated by heat-polymerization or the addition of chemicals to render it nongelatinizing. In carrying out the present invention the gelatinizing property of the raw tung oil is utilized and accordingly it is desired that the oil be in such a condition that it will jell upon heating to the normal gelatinizing temperature, usually between 200° C. and 300° C. While tung oil is preferred other gelatinizing oils of similar character may also be used.

When the rings have been removed from the impregnating solution they are dried in the air for two hours or more and then baked in a suitable oven at the gelatinizing temperature, such as 210° C. to 250° C. for a period of fifteen to thirty minutes. The oil is thereby gelatinized within the pores of the paper thus greatly improving its humidity coefficient but remains soft and jelly-like or rubbery in nature so that the paper remains pliable and resilient. This gives a cushioning effect to the finished unit resulting in very quiet operation.

If desired the above operations could be carried out on the paper in sheet form and the rings could then be punched from the sheets after the above baking is finished.

The resistance layer 24 is next applied by spraying or otherwise and may be so tapered in thickness, width or composition as to give the desired resistance vs. degree of rotation curve in the variable resistance device. The conductive paint terminals are then applied by spraying or painting and the unit is dried and again baked at a temperature sufficient to cure and harden the resistance surface, such as at 220° C. It has been found that the laminated paper bases will warp slightly after impregnation but that the application of the resistance surface layer apparently has an opposing effect which causes the rings to flatten out again. The rings may then be assembled into resistance devices of the type illustrated.

It is also contemplated that the resistance surface could be formed of resistance material suspended in tung oil which is gelatinized on the surface of the ring base.

Terminal bolts 27 and 28 pass through ring 23 and base disc 22 and are in electrical contact with terminal coatings 25 and 26, respectively. Terminal lugs 29 and 30 are secured by bolts 27 and 28, respectively, underneath disc 22 and project out beyond the base to provide for external circuit connections to the two ends of the resistance surface. Bolts 27 and 28 not only serve as terminals but likewise clamp the ring 23 to base disc 22.

Discs 21 and 22 are clamped together at their centers by a metal bushing 32 which passes through these members and a metal disc 33 clamped against the back of disc 21 by bushing 32.

A metal contact ring 34 having an integral terminal lug 35 is mounted against the face of disc 22 within the resistance unit ring 23 and concentric therewith. Ring 34 is held in place by a rivet or eyelet 36 which clamps disc 21 and lug 35 together.

The variable contactor structure comprises a shaft 37 rotatable in bushing 32, a contact arm 38 secured to the end of shaft 37 on the face side of said resistance device, a sliding contactor 40 mounted on the end of said arm and adapted to slide on resistance surface 24 on ring 23, and sliding contact fingers 39 integral with said arm and adapted to slide on contact ring 34. Shaft 37 is held against axial motion by clip washer 31 fitted in an annular groove in shaft 37 adjacent the rear end of bushing 32. Contact arm 38 is secured to the end of shaft 37 and insulated therefrom by a small piece of sheet insulation 41 the end of said shaft being upset to hold said piece 41 in place. Contact arm 38 and piece 41 are clamped together by a rivet pin 42. Pin 42 has a projecting portion 43 for operating a switch element which may be secured to the cover, if desired, so that the switch actuating lever is engaged by projection 43. Arm 38 and contact fingers 39 are of spring construction and are held in tension by clip washer 31 so that the sliding contact portions are held in contact with their respective ring surfaces.

In operation, the terminal lugs 29, 30 and 35 are connected into an external circuit in any desired manner. By turning shaft 37 with a knob or other control means sliding contactor 40 will slide on the resistance surface 24 in a circular path. Thus the length of the resistance path, and consequently the magnitude of the resistance in series with terminal lugs 29 and 35 or 30 and 35 may be varied. Conductive coating 26 extends out a sufficient distance from terminal bolt 27 so that contactor 40 may ride up onto it as it approaches the terminal, thereby reducing the resistance to a negligible value. This enables the turning of arm 38 for a few degrees at the end of the stroke to allow for a switch to be operated by projection 43 on pin 42, if desired, without varying the resistance. The contact arm may be turned until it comes into direct contact with the screw 28 connected to lug 30, thereby reducing the resistance to substantially zero.

The resistance units made according to this invention are extremely quiet in operation and substantially free from change due to humidity variations. The sliding contact is cushioned by the resilient impregnated paper unit making its movement very smooth and quiet, the contactor making for itself a polished smooth path in the matte surface of the resistance layer.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A resistance element for variable resistance devices of the type utilizing a moving contactor engaging the resistance surface, said element comprising a base of porous flexible insulating material impregnated with a gelatinized insulating oil, said oil being resilient and substantially unaffected by normal operating conditions encountered by the variable resistance device in radio circuits, whereby said base is capable of permanently maintaining its resiliency under normal operating conditions.

2. A variable resistance device comprising a base, a resistance layer on said base and a moving contactor adapted to move over said resistance layer in contact therewith, said base comprising a porous flexible material impregnated with gelatinized tung oil.

3. A variable resistance device comprising a base, a resistance face on said base and a moving contactor adapted to move along said resistance face in contact therewith, said base comprising paper impregnated with gelatinized tung oil.

4. A resistance element comprising a paper base and a resistance surface thereon, said base comprising three laminae composed respectively of litho paper, newsprint paper and manila paper.

5. A resistance element comprising a paper base and a resistance surface thereon, said base comprising a litho paper back, a newsprint paper center and a manila paper face upon which said resistance surface is held.

6. A resistance element comprising a paper base and a resistance surface thereon, said base comprising a litho paper back, a newsprint paper center and a manila paper face upon which said resistance surface is held, said base being impregnated with a gelatinized oil.

7. A resistance element for variable resistance devices of the type utilizing a moving contactor engaging a resistance surface, said element comprising a base of porous flexible insulating material impregnated with water proof insulating jelly capable of permanently maintaining its jelly-like consistency under the normal operating conditions encountered by variable resistance devices in radio circuits.

8. A resistance element for a variable resistance device of the type utilizing a moving contactor engaging a resistance surface, said element comprising a porous flexible sheet base of fibrous insulating material impregnated with a water-proof insulating jelly capable of permanently maintaining its jelly-like consistency under the normal operating conditions encountered by variable resistance devices in radio circuits.

LELAND E. LAWRENCE.
ROBERT O. LEWIS.